May 29, 1962 R. H. GOULD 3,036,715
CONTINUOUSLY OPERATING SETTLING AND CLARIFIER
TANK WITH ROTATING FEED ARRANGEMENT
Filed April 29, 1959 5 Sheets-Sheet 1

INVENTOR
Richard H. Gould
BY
ATTORNEY

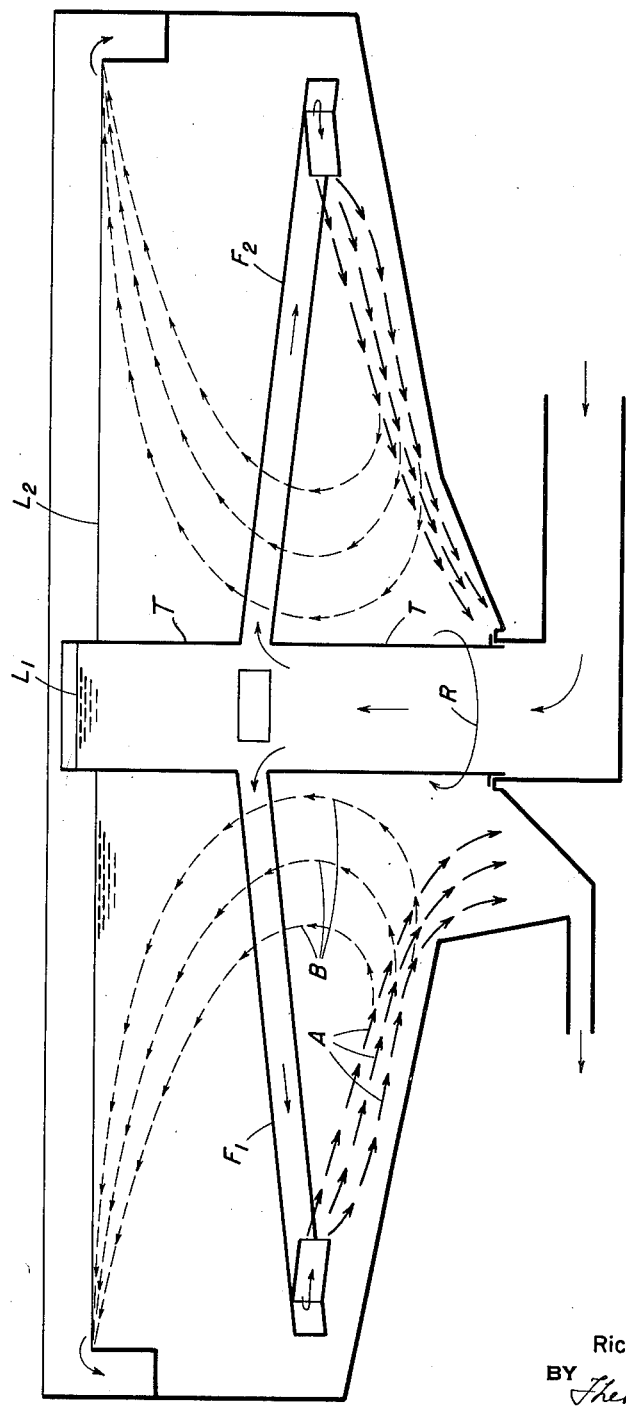

United States Patent Office 3,036,715
Patented May 29, 1962

3,036,715
CONTINUOUSLY OPERATING SETTLING AND CLARIFIER TANK WITH ROTATING FEED ARRANGEMENT
Richard H. Gould, Douglaston, N.Y.
Filed Apr. 29, 1959, Ser. No. 809,836
8 Claims. (Cl. 210—520)

This invention relates to the continuous clarification of liquids carrying solids in suspension, and more particularly of those in which the solids are light or flocculent adapted to settle in the form of a relatively light and dilute sludge, while clarified liquid overflows from the tank.

One object is to improve the efficiency of continuously operating clarification tanks with respect to clarity of the effluent attainable as well as with respect to minimizing the sludge detention time.

An example of the problem involved is found in the secondary or final clarification treatment of sewage liquids containing putrescible matter in suspension for producing aerobic sludge. Preceding this final clarification, the sewage liquid derived as effluent from an initial or primary sewage clarification step, is subjected to aeration to effect conversion of dissolved as well as colloidal impurities into aerobically produced flocs, and these flocs must then be settled in the final clarifier tank for producing supernatant liquid or effluent sufficiently purified and clear for release into open bodies of water from the tank. It is desirable that the time required for detention of the resulting aerobic sludge in the tank be minimized because of its tendency to turn septic in the absence of dissolved oxygen thereby deteriorating not only the supernatant but also adversely affecting or upsetting the proceding aeration step to which a significant portion of healthy aerobic sludge from the final clarifier tank must be returned continuously in order to insure the proper biologic function and efficiency of the aerobic treatment station. It is therefore desirable that the return sludge be transferred as fast as possible from the clarifier tank bottom into the aerobic environment of the aeration station.

More particularly, this invention is concerned with effecting such clarification in a continuously fed settling tank in which the sludge must be moved over the tank bottom from all directions inwardly to a central point of withdrawal, while supernatant liquid may overflow from the periphery of the tank.

In the operation of these tanks, in order to attain optimum clarification of the effluent, as well as volumetric efficiency of the tank, especially when dealing with sludges of the kind above set forth, it is desirable that the path of a current of greater solids concentration near the bottom of the tank should be as short as possible in order that the sludge solids be carried quickly along the bottom to the outlet means, while the path of currents of liquid further above should be as long as possible to afford suspended particles an opportunity to settle.

This invention provides improved means for short-circuiting the sludge over the tank bottom to the outlet means, while long-circuiting the liquid to the effluent weir, in such a manner that the entire tank area may be positively and uniformly covered and utilized.

According to the invention, the improved sedimentation operation comprises maintaining in the tank a body of liquid undergoing sedimentation and clarification, introducing into the body of liquid a flow of feed suspension directed substantially toward the center of the tank, and moving this stream along a circular path about the center of the tank while maintaining the stream oriented substantially towards the center for sequentially impelling all portions of sludge on the tank bottom towards the center, and withdrawing sludge collected at the center.

To this end, the invention provides combined feed discharge and sludge impelling means whereby feed suspension is introduced into the body of liquid undergoing clarification. These combined means comprise a conduit that rotates about the vertical center axis of the tank with the feed suspension discharging from the outer end thereof during such rotation. Directional means are provided effective at the outer end of the conduit and so arranged as to deflect the discharging feed suspension in a direction adapted to impel sludge on the tank bottom towards the sludge withdrawal means during such rotation. A plurality of such radial feed conduits may be angularly spaced from one another so that the sludge impelling effect is positively and uniformly applied over the entire tank area during a fraction of a single revolution.

According to one feature of the invention, the outer end of the feed discharge conduit has at least one lateral bend for discharging the feed suspension in the direction desired to expedite the movement of the sludge towards the outlet means.

According to another feature, rake means are provided to rotate together with the feed conduit in the tank for engaging and conveying the sludge over the tank bottom towards the center thereof for withdrawal.

Other features and advantages will hereinafter appear. The novel features which are considered as characteristic for the invention are set forth in particular in the appended claims. The invention will be best understood from the following description of specific embodiment when read in connection with the accompanying drawings, in which:

FIG. 7 is a general vertical sectional view corresponding to that of FIG. 1, highly diagrammatic illustrating the improved operation.

Figure 2:
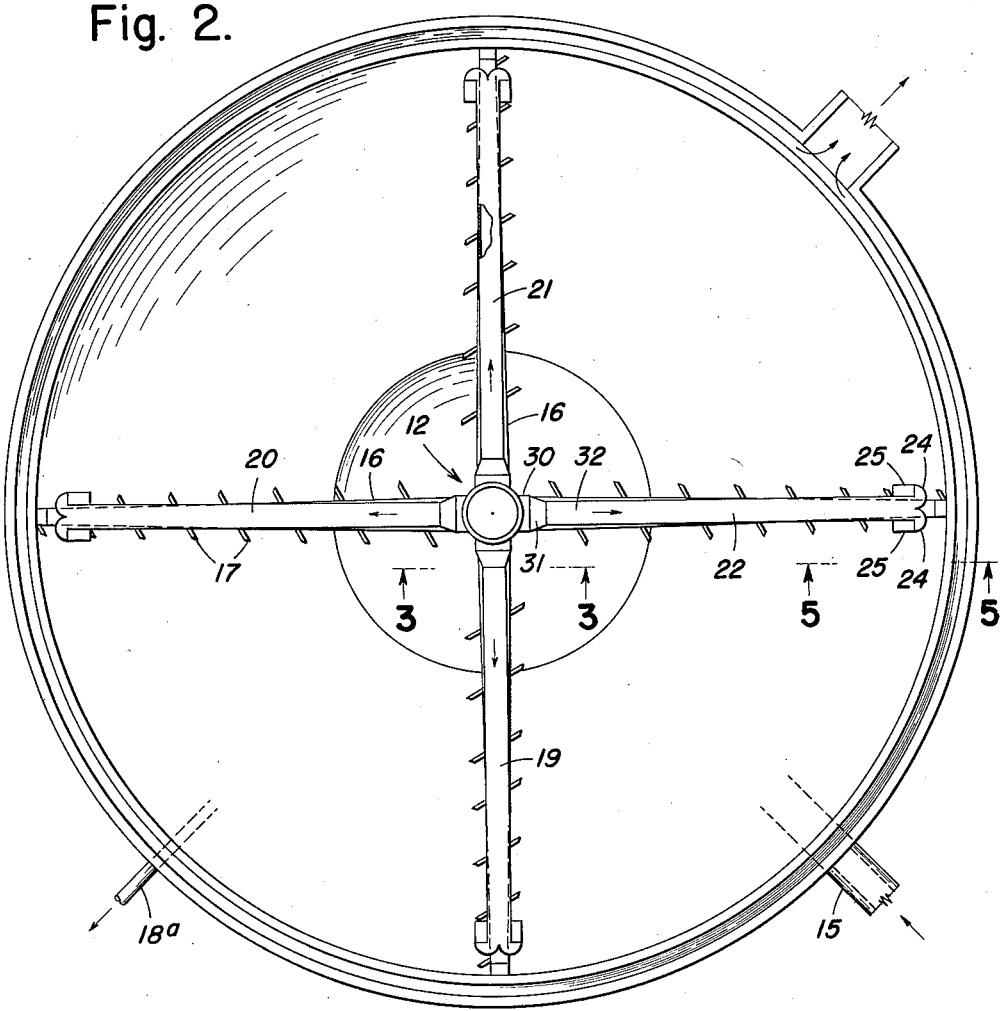
FIG. 2 is a plan view of the tank taken on line 2—2 of FIG. 1 showing a plurality of rake arms each carrying a feed discharge conduit of the kind shown in FIG. 1.
Figure 1:
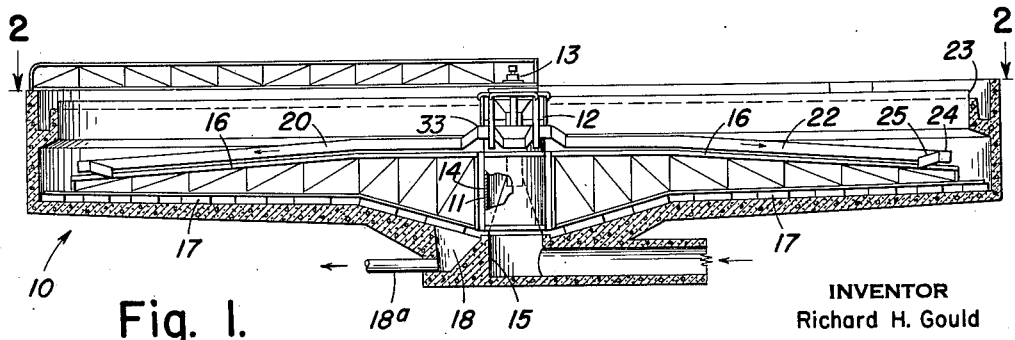
FIG. 1 is a general vertical sectional view of a center pier type settling tank illustrating one embodiment of an arrangement of the feed discharge conduits, in which they are combined with a raking structure.
Figure 3:
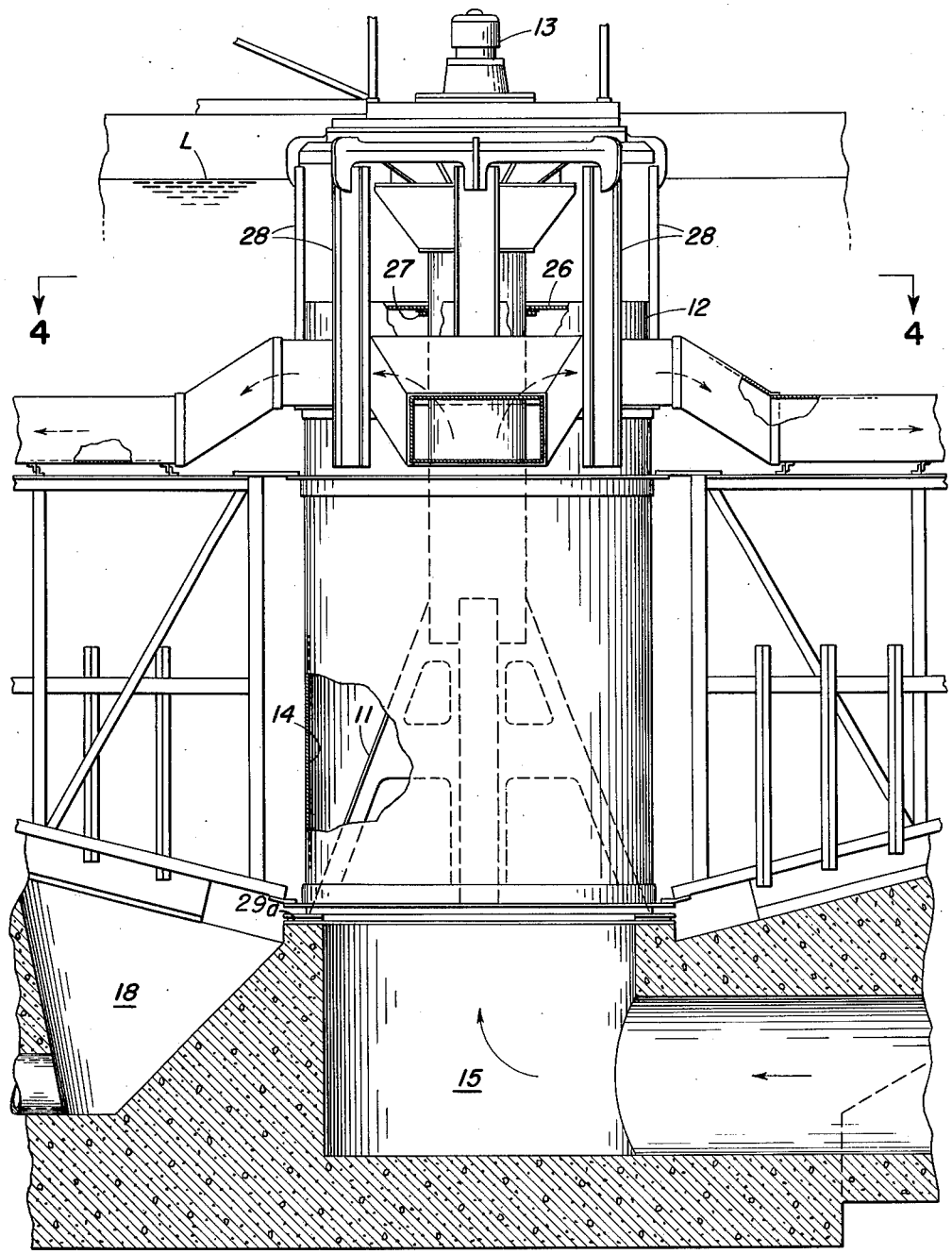
FIG. 3 is a greatly enlarged view of a center pier type bearing support for the raking structure combined with the feed conduits.
Figure 4:
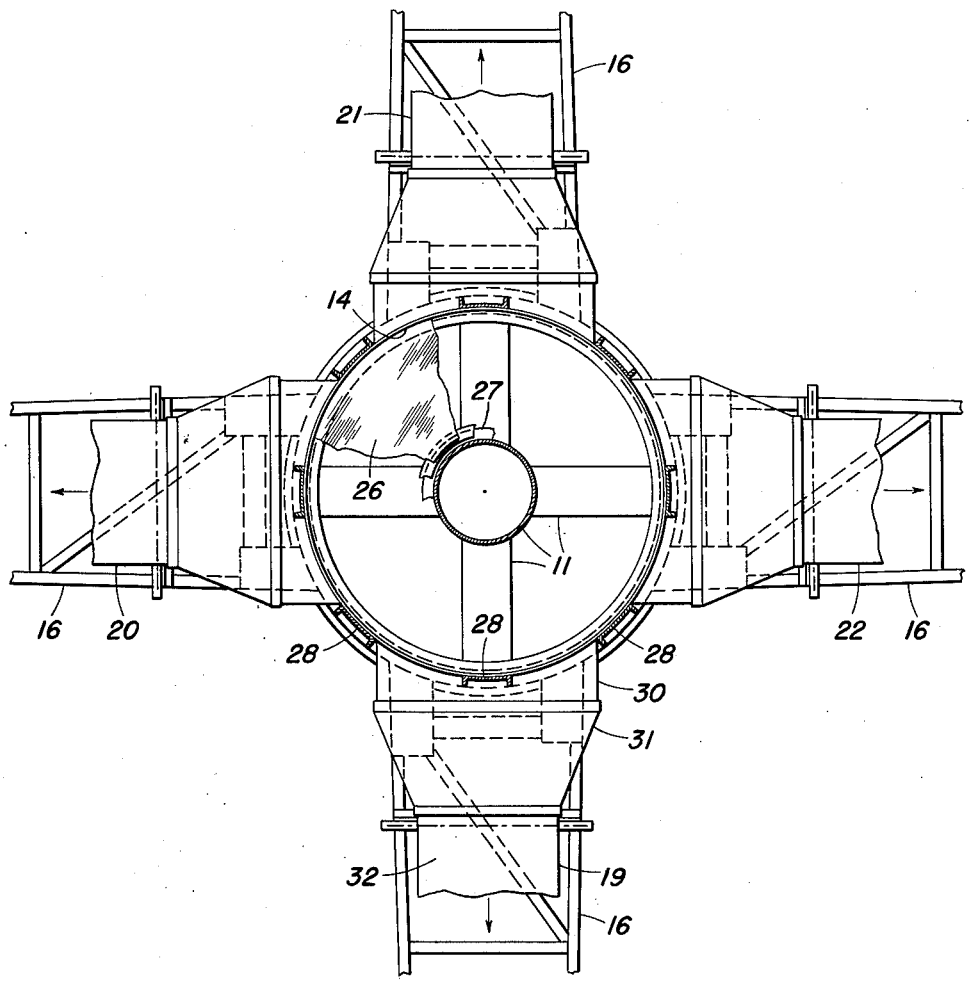
FIG. 4 is a cross-sectional view taken on line 4—4 of FIG. 3.

As shown, by way of example, in the semi-diagrammatic FIGS. 1 and 2, the invention is embodied in a clarifier tank of the center pier type. Accordingly the arrangement includes a tank 10 having a center pier or column 11 for turnably supporting a raking structure 12 rotated by a drive mechanism indicated at 13 of known construction mounted atop the center pier.

In this example, the rotary raking structure 12 has a hub in the form of a vertical tube of large diameter serving as an upflow feed conduit rotatably mounted on the pier and communicating with the feed inlet duct 15 which extends through the bottom of the tank. An annular seal is provided between the rotary tube 14 and the feed inlet duct 15.

A plurality of radial rake arms 16 which may be of girder type construction, preferably four such arms, extend from the tube 14, carrying familiar blade element 17 effective to convey sediment or sludge to a sludge sump 18 adjacent to the center pier, when the raking structure is rotated. Sludge from the sump 18 is pumped away through a discharge pipe 18a.

According to the embodiment herein illustrated, the invention comprises a feed conduit system 33 carried by the rake structure, having submerged radial feed conduits connected and communicating with the vertical feed duct 14 to carry feed suspension from the center of the tank to points radially spaced therefrom in the tank.

The feed conduit system 18 in this embodiment comprises radially extending feed conduits 19, 20, 21, 22 mounted for example atop and radially co-extensive with respective arms of the raking structure. These feed conduits are shown to terminate substantially short of the peripheral wall of the tank and a substantial distance from the peripheral overflow weir 23. Thus it will be noted that the terminal portion of the feed conduits is located considerably closer to the bottom of the tank than to the overflow weir.

Figure 6:
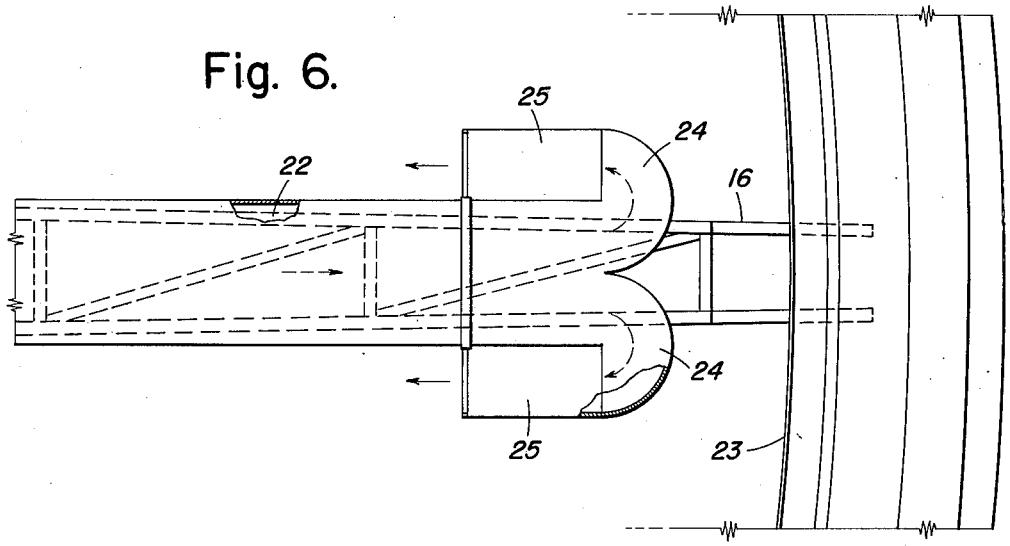
FIG. 6 is a plan view taken on line 6—6 of FIG. 5.
Figure 5:
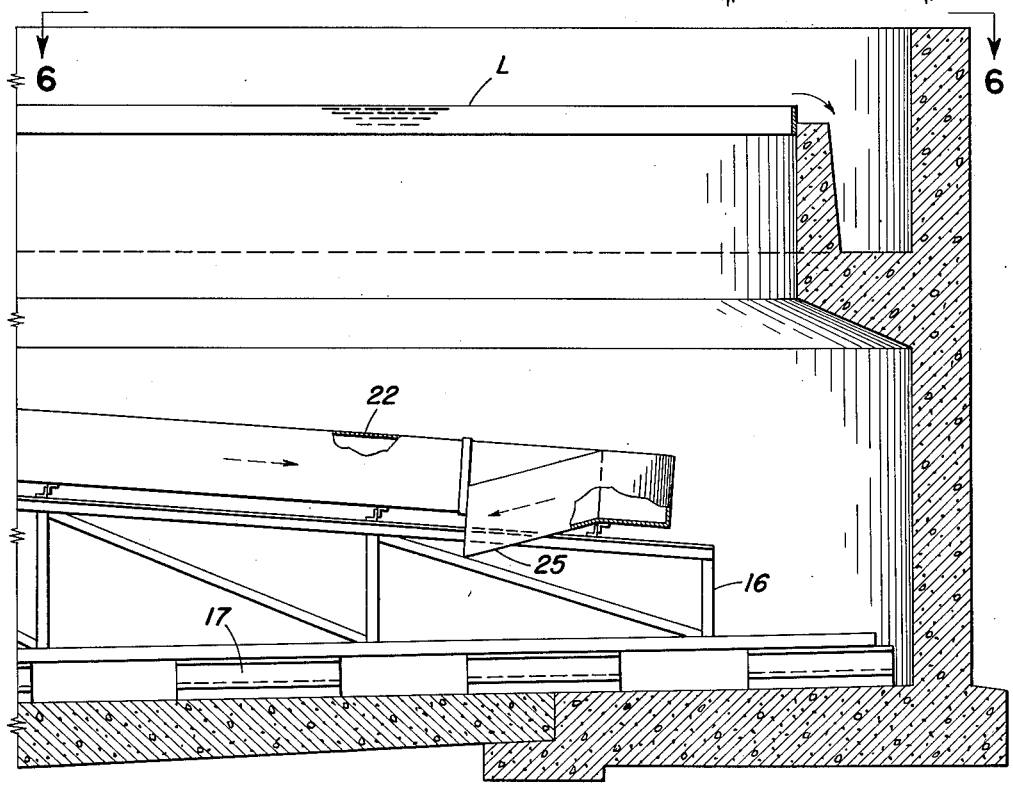
FIG. 5 is an enlarged detail taken on line 5—5 of FIG. 2, showing a side view of the discharge end of a feed conduit with discharge deflecting means therefor.

Referring more particularly to the detail FIGS. 5 and 6, the discharge end of each of the feed discharge conduits in this embodiment is formed with a pair of lateral bends 24 arranged opposite to one another whereby the feed suspension will discharge within the body of liquid undergoing clarification and in the vicinity of the bottom of the tank as well as in the general direction inwardly towards the center of the tank. The terminal bends 24 of each feed discharge conduit may thus be symmetrically arranged, and each bend may have a terminal portion 25 which may be inclined slightly towards the bottom of the tank with the two inclined terminal portions 25 straddling the associated raking arm. In this way, a submerged flow of the feed liquid or suspension discharges into the body of liquid undergoing clarification at a point spaced from the center of the tank, while being moved in a circular path about the center and oriented during such movement for sequentially impelling all portions of the sludge on the tank bottom towards the centrally located sump for withdrawal.

In the present example of the feed discharge conduit arrangement, the top end of the vertical feed tube 14 is closed by a top plate 26 through which extends the center column 11, an annular seal 27 being provided between this column and the plate. The vertical tube 14 has rigidly connected therewith a number of upward vertical connecting members 28 in rigid connection with the tube and spaced along the periphery thereof, the members 28 rigidly connecting the tube to an annular bearing member 29a rotatable about the vertical axis on the column 11 and constituting part of the drive mechanism 13.

The radial feed conduits of generally rectangular and horizontally flattened cross section communicate with the upper end portion of the vertical feed tube 14. Each of these radial conduits comprises a wide discharge neck 30 connected to the hub or tube 14, a reducing conduit portion 31 slightly downwardly inclined from the neck portion 30, and a radial length of duct 32 fastened to the top of the associated rake arm 16 co-extensive therewith and terminating in the aforementioned discharge bends 24. Suitable vent means may be provided at the highest point of this feed conduit arrangement, but are here not particularly shown.

FIG. 7 is a diagrammatic presentation illustrating the aforementioned currents as induced by the present feed arrangement in the body of liquid undergoing clarification. Accordingly, in this diagrammatic presentation, the center feed tube T with feed conduits F1 and F2, when rotated, will encourage short-circuiting of the sludge along the shortest path over the tank bottom to the central point of sludge withdrawal so as to impel or expedite removal of this sludge from the tank. At the same time, this arrangement promotes long-circuiting the liquid along an extended curved path to the peripheral overflow of the tank. These conditions attainable by this invention are indicated by a current shown in heavy flow arrows A representing the greater solids concentration as directed towards the center of the tank, and another current of much lighter solids concentration having a long curved path of travel indicated by the light flow arrows B.

The diagram of FIG. 7 in conjunction with the other drawing figures illustrates the feature that the feed suspension issuing from the outer end of the respective radial feed conduits F1 and F2 is deflected away from the tank wall and in a slightly downwardly inclined direction, adapted to impel the sludge or expedite the sludge movement towards the center of the tank. It will be understood that this impelling effect maintains while the feed conduits rotate with the raking structure so that this impelling effect is imparted in a positive manner and equally distributed to each portion of the sludge on the tank bottom, and that especially the light dilute or flocculent sludges will benefit from this effect even though they may receive additional impulse from the raking blades. Also, the raking blades will be effective to engage and move to the central sludge outlet any heavier solids that may be present in the sludge. In this diagram, the radial conduits extend from a vertical feed tube T here shown to be open at the top so that the free water level L1 therein will have a slight super elevation over the water level L2 in the clarifier tank. Rotation of the conduits is indicated by the arrow R.

Although the feed discharge conduits of this feed system may be employed in various other arrangements and separate from the raking structure or differently combined therewith, the present embodiment shows a preferred arrangement in which these conduits are added to a raking structure and supported by respective arms thereof. The feed discharge deflecting means may assume various other forms since, for example, single bends may be employed instead of the symmetrically arranged twin bends for each conduit, and the bends themselves may take other forms for example, a flaring configuration. Moreover, adjustable throttling means may be provided for each conduit, for example in the form of swingable or sliding gate members or the like, so that flow distribution into the feed conduits may be controlled by the adjustment of these gates. Furthermore, the term "Peripheral Overflow" means for the tank should here be understood as including the arrangement of an annular overflow launder which may be located directly at the wall of the tank or else radially spaced from the wall and in concentric relationship therewith.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds are therefore intended to be embraced by the claims.

I claim:

1. In combination with a settling tank having a bottom with centrally located sludge withdrawal means therein and with overflow means at the top of the tank, combined feed distributing and sludge impelling means operating in a body of liquid undergoing sedimentation in the tank, comprising at least one submerged feed conduit portion extending radially outwardly with respect to the center of the tank and provided at its outer end with at least one terminal bend having an inwardly directed discharge portion for delivering feed suspension into an outer annular zone adjacent to the bottom in a direction substantially opposite to the direction of the flow in said radial conduit portion and aimed in the direction of said centrally located sludge outlet, said submerged radial conduit portion having a downward outward inclination and said inwardly directed discharge portion of the bend having a downward inward inclination, means supporting said conduit portion for rotation about the vertical center axis of the tank, and supply means for introducing feed suspension at the inner end of said radial conduit portion for discharge thereof from said terminal bend adjacent to the bottom of the tank during the rotation of said radial conduit portion, said discharging feed suspension adapted to provide in said body of liquid a current for gently impelling sludge solids in a strata near the tank bottom inwardly along short paths towards said sludge withdrawal means while causing liquid freed of said solids to flow along significantly longer paths upwardly and outwardly away from said short paths towards said overflow means.

2. The arrangement according to claim 1, wherein said radial conduit portion is provided with a pair of laterally arranged terminal bends disposed opposite to one another.

3. The arrangement according to claim 2, wherein said conduit portion as well as said bends have rectangular cross sectional configuration comprising substantially parallel and substantially horizontal top and bottom faces.

4. The arrangement according to claim 1, with the addition of blade means rotating with said radial feed conduit portion for engaging and conveying sludge over the tank bottom towards said sludge withdrawal means.

5. In combination with a settling tank having a shallow bottom provided with a centrally located feed inlet, and having sludge withdrawal means adjacent to said feed inlet and also having overflow means for clarified liquid at the top, combined feed distributing and sludge impelling means submerged in the body of liquid undergoing sedimentation in the tank, comprising a hollow vertical cylindrical hub member supported for rotation about the center of the tank in communication with said bottom feed inlet, at least one submerged feed conduit portion extending radially with respect to the center of the tank with its inner end connected to and communicating with said cylindrical hub member and provided at its outer end with at least one laterally arranged terminal bend having an inwardly directed discharge portion for delivering feed suspension into an outer annular zone adjacent to the tank bottom and in a direction substantially opposite to the direction of flow in said radial conduit portion and aimed in the direction of said centrally located sludge outlet, said submerged radial conduit portion having a downward outward inclination and said inwardly directed discharge portion of the bend having a downward inward inclination, and means supporting said conduit flow for rotation about the vertical center axis of the tank, said discharging feed suspension adapted to provide in said body of liquid a current for gently impelling sludge solids in a strata near the tank bottom inwardly along short paths towards said sludge withdrawal means while causing liquid freed of said solids to flow along significantly longer paths upwardly and outwardly away from said short paths towards said overflow means.

6. The arrangement according to claim 5, with the addition of blade means rotating with said radial feed conduit portion for engaging and conveying sludge over the tank bottom towards said sludge withdrawal means.

7. In combination with a settling tank having a shallow bottom provided with a centrally located feed inlet, and having sludge withdrawal means adjacent to said inlet, and also having overflow means for clarified liquid at the top, combined feed discharge and sludge impelling means comprising a hollow vertical cylindrical hub member supported for rotation about the center of the tank and communicating with said feed inlet, at least one submerged radially extending submerged rake arm carried by said hub member and provided with sludge engaging blade means for conveying sludge over-the-tank bottom towards said outlet means incident to its rotation, a submerged feed conduit portion mounted on said arm substantially coextensive therewith and with its inner end connected to and communicating with said cylindrical hub member and provided at its outer end with at least one laterally arranged terminal bend having an inwardly directed discharge portion for delivering feed suspension into an outer annular zone adjacent to the tank bottom in a direction substantially opposite to the direction of flow in said conduit portion during the joint rotation of said rake arm and said conduit portion and aimed in the direction of said centrally located sludge outlet, said submerged radial conduit portion having a downward outward inclination and said inwardly directed discharge portion of the bend having a downward inward inclination, said discharging feed suspension adapted to provide in said body of liquid a current for gently impelling sludge solids near the tank bottom inwardly along short paths towards said sludge withdrawal means while causing liquid freed of said solids to flow along significantly longer paths upwardly and outwardly away from said short paths towards said overflow means.

8. The arrangement according to claim 7, wherein said conduit portion is provided with a pair of laterally arranged terminal bends disposed opposite to one another with discharge portion straddling the associated portion of said arm.

References Cited in the file of this patent

UNITED STATES PATENTS

| | | |
|---|---|---|
| 1,580,476 | Fassio | Apr. 13, 1926 |
| 2,267,516 | Adams | Dec. 23, 1941 |
| 2,267,608 | Hawley | Dec. 23, 1941 |